United States Patent
Wang et al.

(10) Patent No.: US 10,292,177 B2
(45) Date of Patent: May 14, 2019

(54) RESOURCE SCHEDULING METHOD, RESOURCE DETERMINING METHOD, ENODEB, AND USER EQUIPMENT

(71) Applicant: Panasonic Intellectual Property Corporation of America, Torrance, CA (US)

(72) Inventors: Li Wang, Beijing (CN); Alexander Golitschek Edler Von Elbwart, Hessen (DE); Michael Einhaus, Hessen (DE); Hidetoshi Suzuki, Kanagawa (JP); Lilei Wang, Beijing (CN); Masayuki Hoshino, Kanagawa (JP)

(73) Assignee: Panasonic Intellectual Property Corporation of America, Torrance, CA (US)

(*) Notice: Subject to any disclaimer, the term of this patent is extended or adjusted under 35 U.S.C. 154(b) by 0 days.

(21) Appl. No.: 15/432,772

(22) Filed: Feb. 14, 2017

(65) Prior Publication Data
US 2017/0164384 A1    Jun. 8, 2017

Related U.S. Application Data

(63) Continuation of application No. PCT/CN2014/091216, filed on Nov. 15, 2014.

(51) Int. Cl.
*H04W 72/12* (2009.01)
*H04L 5/00* (2006.01)
(Continued)

(52) U.S. Cl.
CPC ......... *H04W 72/1215* (2013.01); *H04L 5/001* (2013.01); *H04L 5/0044* (2013.01);
(Continued)

(58) Field of Classification Search
None
See application file for complete search history.

(56) References Cited

U.S. PATENT DOCUMENTS

| | | | |
|---|---|---|---|
| 2013/0163543 A1* | 6/2013 | Freda ............... | H04W 72/0406 370/329 |
| 2014/0044105 A1 | 2/2014 | Bontu et al. | |

(Continued)

FOREIGN PATENT DOCUMENTS

| | | |
|---|---|---|
| CN | 103580840 A | 2/2014 |
| WO | 2013/006988 A1 | 1/2013 |
| WO | 2016/070397 A1 | 5/2016 |

OTHER PUBLICATIONS

Extended European Search Report dated Oct. 11, 2017, for European Patent Application No. 14905672.3-1875 / 3219141, 10 pages.
(Continued)

*Primary Examiner* — Jamaal R Henson
(74) *Attorney, Agent, or Firm* — Seed IP Law Group LLP

(57) ABSTRACT

Provided are a resource scheduling method, a resource determining method, an eNB, and a user equipment. The resource scheduling method for wireless communication is performed by the eNB. The wireless communication involves at least a first carrier and a second carrier. The resource scheduling method includes: transmitting a DCI in the first carrier to a UE to schedule downlink resources for a PDSCH of the second carrier, wherein the eNB is able to start transmitting a burst in the second carrier at a flexible time independent of the subframe boundaries of the second carrier after the second carrier is occupied by the eNB, and the DCI for a flexible PDSCH of the burst different from the normal PDSCH of the second carrier contains information on the time period scheduled for the flexible PDSCH. The flexible PDSCH and its corresponding RS can reuse the DwPTS subframe structure for minimal specification impact.

16 Claims, 7 Drawing Sheets

100

101

Transmitting a DCI in the first carrier to a UE to schedule downlink resources for a PDSCH of the second carrier

(51) Int. Cl.
*H04W 16/14* (2009.01)
*H04L 5/14* (2006.01)
*H04W 76/15* (2018.01)

(52) U.S. Cl.
CPC .......... *H04L 5/0053* (2013.01); *H04L 5/0092* (2013.01); *H04W 72/1289* (2013.01); *H04L 5/0007* (2013.01); *H04L 5/0062* (2013.01); *H04L 5/1469* (2013.01); *H04W 16/14* (2013.01); *H04W 76/15* (2018.02)

(56) References Cited

U.S. PATENT DOCUMENTS

| | | | |
|---|---|---|---|
| 2014/0112289 A1 | 4/2014 | Kim et al. | |
| 2015/0349931 A1* | 12/2015 | Damnjanovic | H04L 5/0007 370/280 |
| 2017/0310422 A1* | 10/2017 | Baker | H04L 1/18 |
| 2017/0353277 A1* | 12/2017 | Baker | H04W 72/1289 |

OTHER PUBLICATIONS

Alcatel-Lucent Shanghai Bell, Alcatel-Lucent, "LBT Enhancements for Licensed-Assisted Access," R1-144701, 3GPP TSG RAN WG1 Meeting #79, Agenda Item 6.3.2.2, San Francisco, USA, Nov. 17-21, 2014, 5 pages.

International Search Report of PCT application No. PCT/CN2014/091216 dated Aug. 17, 2015.

Nokia Networks, Nokia Corporation, on Listen Before Talk and Channel Access [online], 3GPP TSG-RAN WG1#79 R1-145003, Retrieved from the Internet:URL:http://www.3gpp.org/ftp/tsg_ran/WG1_RL1/TSGR1_79/Docs/R1-145003. zip [retrieved on Nov. 8, 2014].

Communication pursuant to Article 94(3) EPC dated Jan. 7, 2019 for the related European Patent Application No. 14905672.3.

\* cited by examiner

RESOURCE SCHEDULING METHOD, RESOURCE DETERMINING METHOD, ENODEB, AND USER EQUIPMENT

BACKGROUND

1. Technical Field

The present disclosure relates to the field of wireless communication, and in particular, to a resource scheduling method, a resource determining method, an eNode B (eNB), and a user equipment.

2. Description of the Related Art

Rapid growth of mobile data forces operators to utilize the finite frequency spectrum with higher and higher efficiency, while plenty of unlicensed frequency spectra are utilized less efficiently only by WiFi, Bluetooth, etc. LTE-U (LTE-unlicensed) can extend the LTE spectrum to unlicensed band that would augment the network capacity directly and dramatically. LTE-U with LAA (Licensed Assisted Access) has higher spectrum efficiency than WiFi especially when massive users, e.g., reliable CCH (Control CHannel), LA (Link Adaption), HARQ, ICIC (Inter Cell Interference Coordination), interference cancellation. LTE-U can well co-exist with the existed RATs by mechanisms such as LBT (Listen Before Talk), DFS (Dynamic Frequency Selection), TPC (Transmit Power Control). Network architecture will be simpler and more unified.

SUMMARY

In one general aspect, the techniques disclosed here feature a resource scheduling method for wireless communication performed by an eNode B (eNB), the wireless communication involving at least a first carrier and a second carrier, and the method including: transmitting downlink control information (DCI) in the first carrier to a user equipment (UE) to schedule downlink resources for a physical downlink shared channel (PDSCH) of the second carrier, wherein the eNB is able to start transmitting a burst in the second carrier at a flexible time independent of the subframe boundaries of the second carrier after the second carrier is occupied by the eNB, and the DCI for a flexible PDSCH of the burst different from the normal PDSCH of the second carrier contains information on the time period scheduled for the flexible PDSCH.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
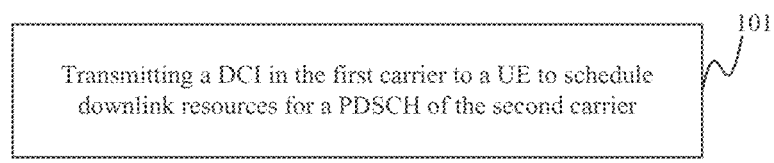
FIG. 1 illustrates a flowchart of a resource scheduling method for wireless communication according to an embodiment of the present disclosure.

In the following detailed description, reference is made to the accompanying drawings, which form a part thereof. In the drawings, similar symbols typically identify similar components, unless context dictates otherwise. It will be readily understood that the aspects of the present disclosure can be arranged, substituted, combined, and designed in a wide variety of different configurations, all of which are explicitly contemplated and make part of this disclosure.

How to schedule resources of unlicensed carrier by eNB is an important issue that needs to be resolved in LAA. LTE Carrier aggregation architecture (licensed PCell and unlicensed SCell) is a basic assumption. Cross-carrier scheduling by licensed band is a natural mechanism in carrier aggregation to grant resources in unlicensed carriers due to reliable control signaling transmission in licensed carrier. Aligned subframes between licensed carrier and unlicensed carrier could reuse the current scheduling mechanisms in LTE carrier aggregation. In cross-carrier scheduling mechanism currently existing, control and data are sent in the same subframe time but on different carriers. The eNB can access the unlicensed channel just at fixed points of time (e.g., PDSCH boundary or subframe boundary), while other nodes such as Wi-Fi can access the channel immediately after successful CCA (Clear Channel Assessment). In this sense, the access priority of LAA would be de-prioritized compared with Wi-Fi.

In the present disclosure, a mechanism of flexibly scheduling the starting time of a burst in the unlicensed carrier (also referred to as unlicensed band) is provided. In other words, the eNB can start to transmit a burst in the unlicensed carrier at a flexible time independent of the subframe boundaries after the unlicensed carrier is occupied by the eNB (e.g., after successful CCA). In particular, the starting time of PDSCH in the burst can be flexibly scheduled. By flexibly scheduling the starting time of the burst or the PDSCH, the eNB has the possibility to occupy the unlicensed carrier at any moment independent of the subframe boundary immediately after successful CCA.

It is noted that although embodiments of the present disclosure may be described in the context of licensed band and unlicensed band, the present disclosure is not limited to it but can be applied to any wireless communication involving two different carriers which are referred to as a first carrier (e.g., the licensed carrier) and a second carrier (e.g., the unlicensed carrier) in the present disclosure.

According to the present disclosure, there is provided a resource scheduling method for wireless communication performed by an eNB. The wireless communication involves at least a first carrier (e.g., the licensed carrier) and a second carrier (e.g., the unlicensed carrier). A flowchart of the resource scheduling method is illustrated in FIG. 1 as method 100. The method 100 includes a step 101 of transmitting a DCI in the first carrier to a UE to schedule downlink resources for a PDSCH of the second carrier, wherein the eNB can start to transmit a burst in the second carrier at a flexible time independent of the subframe boundaries of the second carrier after the second carrier is occupied by the eNB, and the DCI for a flexible PDSCH of the burst different from the normal PDSCH of the second carrier contains information on the time period scheduled for the flexible PDSCH. Preferably, subframes of the second carrier are aligned with subframes of the first carrier, which can reuse the current scheduling mechanisms in LTE carrier aggregation. It is noted that the normal PDSCH here refers to the PDSCH with fixed boundaries and length. If the subframe of the second carrier has no PDCCH, the boundaries of the normal PDSCH are the same as the boundaries of the subframe. If the subframe has PDCCH, the starting boundary of the normal PDSCH is the ending of the PDCCH and the ending boundary of the normal PDSCH is the ending boundary of the subframe in which the normal PDSCH resides. The flexible PDSCH here refers to a PDSCH different from the normal PDSCH. For example, the starting time and/or the ending time of the flexible PDSCH is shifted from respective boundaries of the normal PDSCH. The length of the flexible PDSCH can be shorter or longer than the normal PDSCH.

According to the method 100, the eNB can start a burst in the second carrier at a flexible time after successful CCA without being limited by the subframe boundaries. Herein, the term "flexible" means the stating time is not limited to the subframe boundaries or the normal PDSCH boundaries and can be changed as required. For example, the eNB can start to transmit signals immediately after successful CCA. The signals can be a reservation signal such as RTS/CTS (Request To Send/Clear To Send) or other signals followed by PDSCH(s), or only PDSCH(s). When transmitting PDSCH, its granularity can be one OFDM symbol. In other words, the flexible starting time of the first PDSCH in the burst can be the first available OFDM symbol after the ending time of the successful CCA. In this way, the eNB has the possibility to occupy the second carrier at any moment independent of the subframe boundary immediately after successful CCA.

In addition, since the starting time of the burst is flexibly scheduled, the first and/or the last PDSCH in the burst may not be aligned with normal PDSCHs; therefore, according to method 100, the DCI for a flexible PDSCH of the burst contains information on the time period scheduled for the flexible PDSCH. Probably, the DCI for the first or the last PDSCH in the burst may be the flexible PDSCH. As for normal PDSCHs, the DCI defined in the present disclosure may also be used, in other words, the normal PDSCH and the flexible PDSCH may use the same DCI format, details of which will be described later. It is noted that the information on the time period is not necessarily to contain the starting time and the ending time of the PDSCH, but can be any information which can derive the time period. For example, the information can be the ending time or the starting time and the length of the PDSCH. Alternatively, if the starting time or the ending time is known to the UE, only the length may need to be contained. According to the present disclosure, the DCI can be sent in a PDCCH or EPDCCH ((E)PDCCH) of the first carrier after the second channel is occupied by the eNB; alternatively the DCI can also be sent in an (E)PDCCH of the first carrier before the second channel is occupied by the eNB. In addition, the DCI can be sent in a same or different subframe with the subframe sending the PDSCH, and can be sent before or after sending the PDSCH even in the same subframe (here, the term of "before" or "after" means the starting of the sending is "before" or "after"). For example, if the EPDCCH is used in the first carrier to send the DCI, the PDSCH in the second carrier can start to be sent before the starting of the EDPCCH in the same subframe. Alternatively, in particular, the DCI can be sent in the next subframe to the subframe starting the PDSCH transmission.

Figure 2:
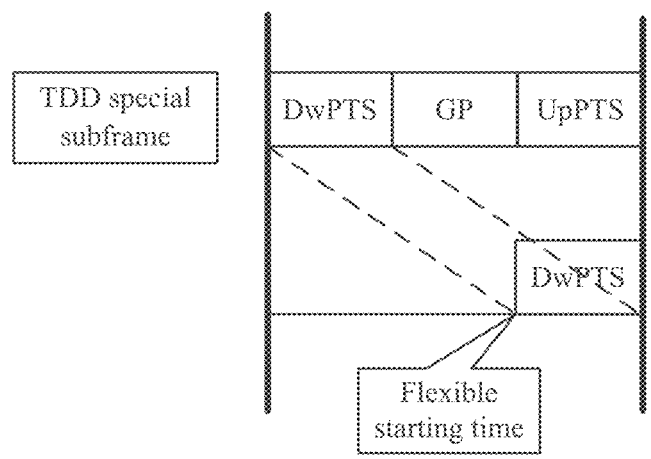
FIG. 2 is a diagram for schematically illustrating the shifting of the shortened PDSCH using the DwPTS subframe structure.

According to method 100, some PDSCH, in particular the first PDSCH and the last PDSCH, in the burst may have different length with a normal PDSCH. For example, the first PDSCH may start in the first available OFDM symbol after the ending time of the successful CCA, and end at the ending boundary of the subframe in which the first PDSCH starts or at the ending boundary of the next subframe to the subframe in which the first PDSCH starts. The first PDSCH in the former case can be a shortened PDSCH which is shorter than a normal PDSCH (it may also be a normal PDSCH if the starting time of the first PDSCH happens to be at a boundary of a normal PDSCH), and the first PDSCH in the later case is an extended PDSCH which is one shortened or normal PDSCH plus one normal PDSCH. The shortened PDSCH and the extended PDSCH belong to the flexible PDSCH. According to the present disclosure, both shortened and extended PDSCHs can be adopted based on designed strategy. Preferably, the flexible PDSCH and its corresponding reference signal (RS) reuse the DwPTS (Downlink Pilot Time Slot) subframe structure. For example, for a shortened PDSCH, if the starting time of the shortened PDSCH is not at a starting time of a normal PDSCH (e.g., the first PDSCH in the flexible scheduling is usually the case), the shortened PDSCH using DwPTS subframe structure can be entirely shifted to start at the OFDM symbol scheduled by eNB. FIG. 2 schematically illustrates such shifting. It is noted that the existing DwPTS includes one or two OFDM symbols from the starting point as PDCCH. Therefore, when there is no PDCCH in the unlicensed band, two possibilities exist for the shortened PDSCH, that is, the shortened PDSCH may start from the first OFDM symbol of the DwPTS or start from the second or the third OFDM symbol of the DwPTS. In addition, corresponding PDSCH mapping, RS pattern, and transport block size (TBS) table may be modified only if necessary.

Figure 3:
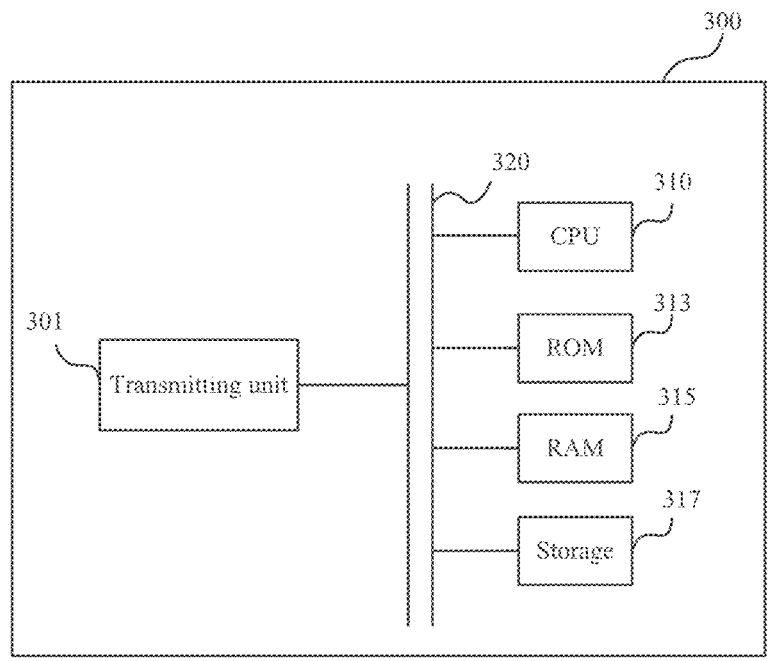
FIG. 3 illustrates a block diagram of an eNB according to an embodiment of the present disclosure.

In the present disclosure, an eNB for resource scheduling of wireless communication is also provided. The wireless communication involves at least a first carrier and a second carrier. FIG. 3 schematically illustrates a block diagram of such an eNB 300. The eNB 300 includes a transmitting unit 301 configured to transmit a DCI in the first carrier to a UE to schedule downlink resources for a PDSCH of the second carrier, wherein the eNB can start to transmit a burst in the second carrier at a flexible time independent of the subframe boundaries of the second carrier after the second carrier is occupied by the eNB, and the DCI for a flexible PDSCH of the burst different from the normal PDSCH of the second carrier contains information on the time period scheduled for the flexible PDSCH.

The eNB 300 according to the present disclosure may optionally include a CPU (Central Processing Unit) 310 for executing related programs to process various data and control operations of respective units in the eNB 300, a ROM (Read Only Memory) 313 for storing various programs required for performing various process and control by the CPU 310, a RAM (Random Access Memory) 315 for storing intermediate data temporarily produced in the procedure of process and control by the CPU 310, and/or a storage unit 317 for storing various programs, data and so on. The above transmitting unit 301, CPU 310, ROM 313, RAM 315 and/or storage unit 317 etc. may be interconnected via data and/or command bus 320 and transfer signals between one another.

Respective units as described above do not limit the scope of the present disclosure. According to one implementation of the disclosure, the functions of the above transmitting unit 301 may be implemented by hardware, and the above CPU 310, ROM 313, RAM 315 and/or storage unit 317 may not be necessary. Alternatively, the functions of the above transmitting unit 301 may also be implemented by functional software in combination with the above CPU 310, ROM 313, RAM 315 and/or storage unit 317 etc.

Figure 4:
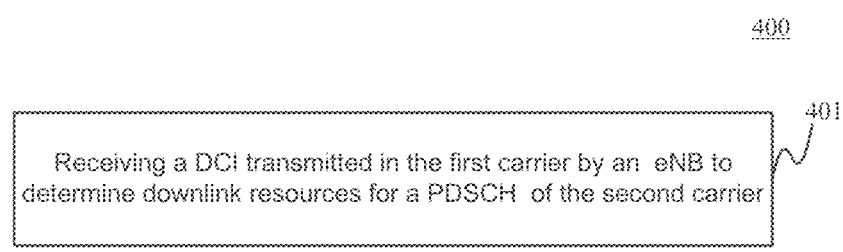
FIG. 4 illustrates a flowchart of a resource determining method for wireless communication according to an embodiment of the present disclosure.

Accordingly, at the UE side, the present disclosure provides a resource determining method for wireless communication performed by a UE. The wireless communication involves at least a first carrier and a second carrier. FIG. 4 illustrates a flowchart of the resource determining method 400. The method 400 includes a step 401 of receiving a DCI transmitted in the first carrier by an eNB to determine downlink resources for a PDSCH of the second carrier, wherein the UE is able to receive a burst in the second carrier started by the eNB at a time independent of the subframe boundaries of the second carrier after the second carrier is occupied by the eNB, and at least the DCI for the first PDSCH of the burst and/or the DCI for the last PDSCH of the burst contains information on the time period scheduled for the respective PDSCH. It is noted that the above details described at the eNB side can also apply to the UE side, which will be repeated here.

Figure 5:
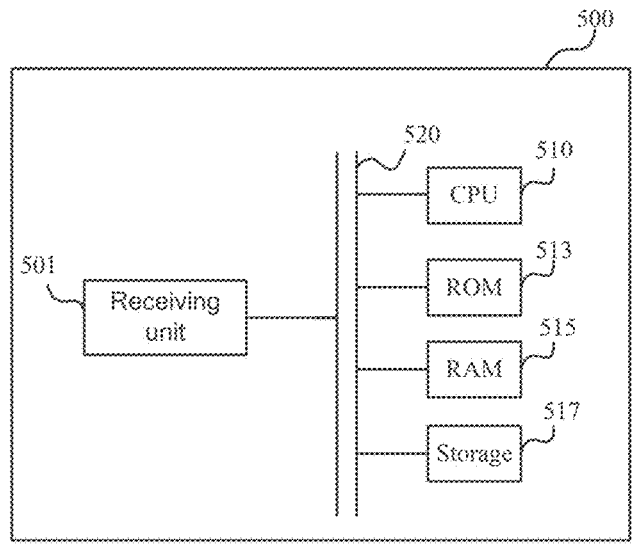
FIG. 5 illustrates a block diagram of a UE according to an embodiment of the present disclosure.

In addition, the present disclosure also provides a UE for resource determining of wireless communication. The wireless communication involves at least a first carrier and a second carrier. FIG. 5 schematically illustrates a block diagram of such a UE 500. The UE 500 includes a receiving unit 501 configured to receive a DCI transmitted in the first carrier by an eNB to determine downlink resources for a PDSCH of the second carrier, wherein the UE is able to receive a burst in the second carrier started by the eNB at a flexible time independent of the subframe boundaries of the second carrier after the second carrier is occupied by the eNB, and the DCI for a flexible PDSCH of the burst different from the normal PDSCH of the second carrier contains information on the time period scheduled for the flexible PDSCH.

The UE 500 according to the present disclosure may optionally include a CPU (Central Processing Unit) 510 for executing related programs to process various data and control operations of respective units in the UE 500, a ROM (Read Only Memory) 513 for storing various programs required for performing various process and control by the CPU 510, a RAM (Random Access Memory) 515 for storing intermediate data temporarily produced in the procedure of process and control by the CPU 510, and/or a storage unit 517 for storing various programs, data and so on. The above receiving unit 501, CPU 510, ROM 513, RAM 515 and/or storage unit 517 etc. may be interconnected via data and/or command bus 520 and transfer signals between one another.

Respective units as described above do not limit the scope of the present disclosure. According to one implementation of the disclosure, the functions of the above receiving unit 501 may be implemented by hardware, and the above CPU 510, ROM 513, RAM 515 and/or storage unit 517 may not be necessary. Alternatively, the functions of the above receiving unit 501 may also be implemented by functional software in combination with the above CPU 510, ROM 513, RAM 515 and/or storage unit 517 etc.

In the following, the present disclosure will be described in detail by embodiments.

First Embodiment

In the first embodiment, the eNB can transmit the first PDSCH of the burst starting with the first available OFDM symbol after the second carrier is occupied by the eNB (e.g., after successful CCA) and ending with the ending boundary of the subframe in which the first PDSCH starts. For example, after successful CCA in the unlicensed band, the eNB sends data in PDSCH which starts with the first OFDM symbol available for data transmission and ends with the ending boundary of the current subframe. It is noted that the first available OFDM symbol is not necessary to be the first OFDM symbol after CCA ending because a reservation signal such as preamble, PSS/SSS (Primary Synchronization Signal/Secondary Synchronization Signal) or RTS/CTS can be sent after CCA ending and before the first PDSCH. The first PDSCH of the burst in the first embodiment can be a shortened PDSCH or a normal PDSCH.

Figure 6:
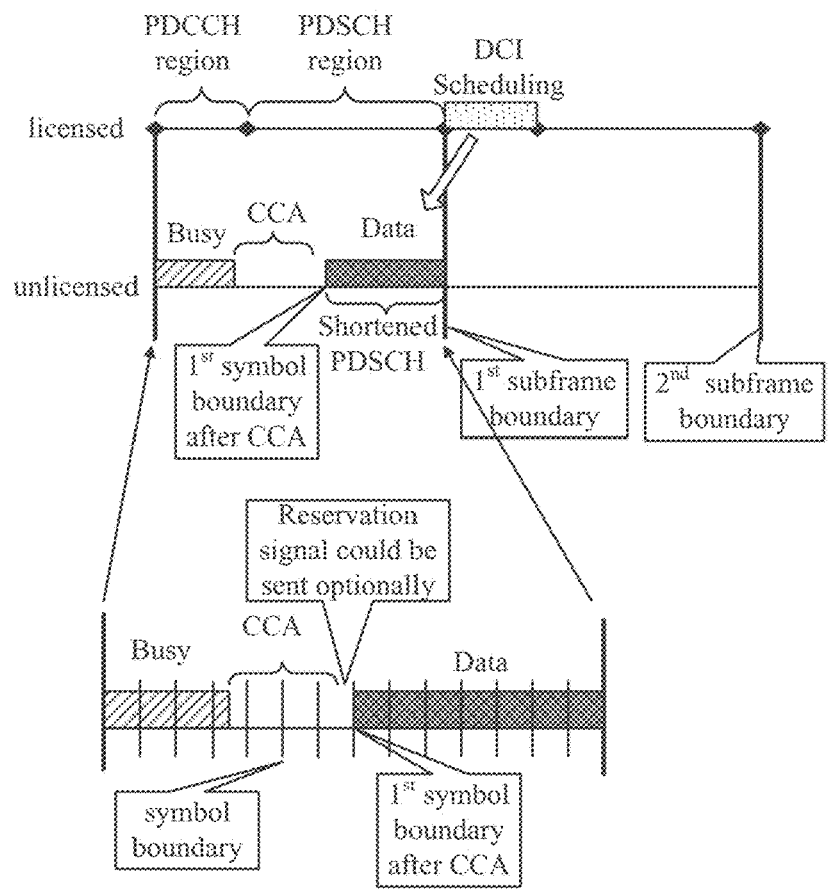
FIG. 6 schematically illustrates an exemplary time sequence diagram for the licensed carrier and the unlicensed carrier according to a first embodiment of the present disclosure.

FIG. 6 schematically illustrates an exemplary time sequence diagram for the licensed carrier and the unlicensed carrier according to the first embodiment of the present disclosure. As shown in FIG. 6, in the unlicensed band, the data in the first PDSCH (which is a shortened PDSCH in FIG. 6) can be sent by starting from the first symbol boundary after CCA, and optionally a reservation signal can be sent before the first PDSCH. When a reservation signal is sent before the first PDSCH, the first PDSCH may start with a subsequent symbol other than the first one, and the subsequent symbol can also be referred to as the first available symbol since the symbols before it is not available for PDSCH. The ending of the first PDSCH is the ending boundary of the current subframe, i.e., the $1^{st}$ subframe boundary as shown in FIG. 6.

In case of normal CP (Cyclic Prefix) and no PDCCH region in the unlicensed band, the normal PDSCH consists of 14 OFDM symbols. The starting symbol of the flexibly started PDSCH (e.g., the first PDSCH of the burst in the embodiment) can be the $1^{st}$ to $14^{st}$ symbol depending on CCA ending time, and thus the OFDM symbol number for the flexibly started PDSCH is from 14 to 1. If the OFDM symbol number is smaller than 14, the PDSCH is referred to as a shortened PDSCH. It is noted that if the length of the first PDSCH is 14 symbols, the first PDSCH is a normal PDSCH.

The shortened PDSCH and corresponding RS (Reference Signal) would reuse the DwPTS subframe structure for minimal specification impact. The shortened PDSCH using DwPTS subframe structure is entirely shifted to start at the OFDM symbol scheduled by eNB as shown in FIG. 2. Only length of 6/9/10/11/12 symbols are defined for PDSCH with normal CP in current DwPTS, and other length of the shortened PDSCH (if supported) can reuse the same structure and define new TBS (Transport Block Size) mapping as follows:

For length of 6/9/10/11/12 OFDM symbols,
    Reuse the current TBS determination for PDSCH in DwPTS defined in 3GPP 36.213
    Reuse RS (e.g., CRS/DMRS) mapping defined in 3GPP 36.211
For length of 13/14 OFDM symbols
    Reuse the current TBS determination for PDSCH in normal subframe defined in 3GPP 36.213
    Reuse RS (e.g., CRS/DMRS) mapping defined in 3GPP 36.211
For length of 1/2/3/4/5/7/8 OFDM symbols
    TBS determination
        Candidate-1: Define new TBS determination, e.g., $N_{PRB}=\max\{\lfloor N'_{PRB}\times\beta\rfloor, 1\}$, where $N_{PRB}$ is the column indicator of TBS table in 3GPP 36.213, $N'_{PRB}$ is the total number of allocated PRBs, and $\beta$ is a coefficient derived from the number of data REs in a target PDSCH (for example, $\beta$ can be derived through dividing the number of data REs in the target PDSCH by the average number of data RES in the existing PDSCHs; in addition, different $\beta$ can be used for different PDSCH lengths, or a common $\beta$ can be used for multiple PDSCH lengths for example by averaging individual $\beta$)
        Candidate-2: Reuse the TBS determination for DwPTS with 6 OFDM symbols defined in 3GPP 36.213, e.g., $N_{PRB}=\max\{\lfloor N'_{PRB}\times 0.375\rfloor, 1\}$ for length of 4/5/7/8 OFDM symbols
        Candidate-3: No PDSCH with undefined length will be scheduled e.g., for length of 1/2/3 OFDM symbols
    RS mapping
        Candidate-1: Reuse RS (e.g., CRS/DMRS) mapping defined in 3GPP 36.211, e.g., for length of 4/5/7/8 OFDM symbols
        Candidate-2: Introduce a new RS, e.g., a new DMRS located in the first OFDM symbol of PDSCH with length of 1/2/3 OFDM symbols In order to indicate the time period of the first PDSCH of the burst in the unlicensed carrier, a DCI would be sent at PDCCH/EPDCCH of the licensed band. The DCI can be sent after or before the unlicensed channel is occupied by the eNB. For example, the DCI can be sent in the subframe transmitting the first PDSCH or the next subframe. In the example of FIG. 6, the DCI is sent in the next subframe. As an example, the DCI for the first PDSCH contains an ending indicator (i.e., ending subframe boundary field) to indicate whether the ending time of the first PDSCH is the starting boundary or the ending boundary of the subframe transmitting the DCI and a length indicator to indicate the length of the first PDSCH. It is noted that, in the first embodiment, if the first PDSCH is a shortened PDSCH (one kind of flexible PDSCH), the above defined DCI will be used, that is, the above defined DCI is for the first PDSCH as the flexible PDSCH. As for the case of the first PDSCH being a normal PDSCH, a normal DCI can be used, or the above defined DCI can also be used. The selection of the DCI formats can be specified or configured. When the above defined DCI is used for a normal PDSCH (not only for the first PDSCH, but possibly also for other normal PDSCHs), the length of the PDSCH is set to be 14 in case of normal CP and no PDCCH region.

Specifically, for the ending subframe boundary field in DCI, one bit can be used to indicate the ending time (e.g., the ending subframe boundary) for example with respect to the subframe for sending the DCI in (E)PDCCH. For example, "0" indicates that the PDSCH ends at the starting boundary ($1^{st}$ subframe boundary in FIG. 6) of the subframe sending the DCI, and "1" indicates that the PDSCH ends at the ending boundary ($2^{nd}$ subframe boundary in FIG. 6) of the subframe sending the DCI.

For the length indicator for indicating the length of first PDSCH for example in terms of OFDM symbol, for example, 4 bits can be used to indicate the PDSCH length from 1 to 14 ("14" indicates a normal PDSCH) OFDM symbols. However, a reduced number of bits can also be used in connection with a reduced set of possible starting positions in order to reduce signaling overhead as well as increase the robustness of the DCI due to the reduced coding rate. For example, a 2-bit indicator can be used for length of 3/6/9/14 OFDM symbols, or a 1-bit indicator can be used for length of 7/14 OFDM symbols.

The above method can also be applied to OFDM symbols with extended CP. According to the first embodiment, buffering PDSCH with different lengths in eNB may be needed due to unpredictable time for successful CCA, and the UE may need to buffer one previous subframe for first PDSCH.

Second Embodiment

In the second embodiment, the eNB can transmit the first PDSCH of the burst starting with the first available OFDM symbol after the second carrier is occupied by the eNB (e.g., after successful CCA) and ending with the ending boundary of the next subframe to the subframe (current subframe) in which the first PDSCH starts. For example, after successful CCA in the unlicensed band, the eNB sends data in PDSCH which starts with the first OFDM symbol available for data transmission and ends with the ending boundary of the next subframe to the current subframe. As described in the first embodiment, it is noted that the first available OFDM symbol is not necessary to be the first OFDM symbol after CCA ending because a reservation signal such as preamble, RTS/CTS or PSS/SSS can be sent after CCA ending and before the first PDSCH. The first PDSCH of the burst in the second embodiment is an extended PDSCH.

Figure 7:
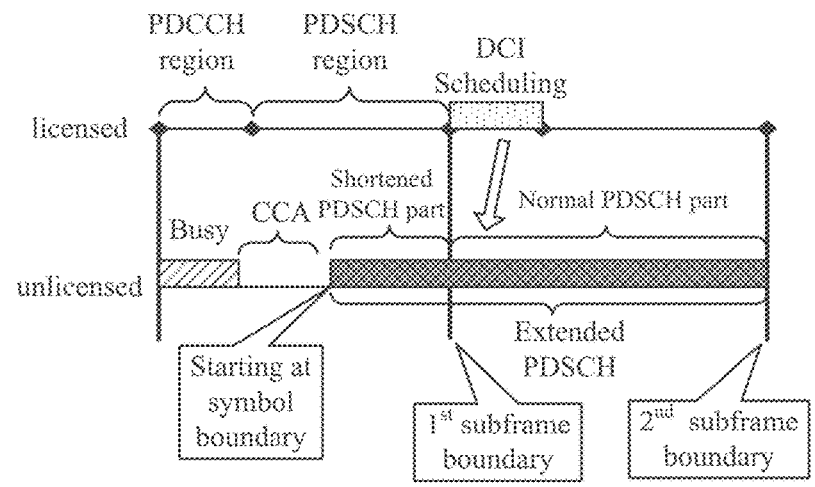
FIG. 7 schematically illustrates an exemplary time sequence diagram for the licensed carrier and the unlicensed carrier according to a second embodiment of the present disclosure.

FIG. 7 schematically illustrates an exemplary time sequence diagram for the licensed carrier and the unlicensed carrier according to the second embodiment of the present disclosure. As shown in FIG. 7, in the unlicensed band, the data in the first PDSCH (extended PDSCH) can be sent by starting from the first symbol boundary after CCA. Optionally, a reservation signal can also be sent before the first PDSCH. The ending of the first PDSCH is the ending boundary of the next subframe to the current subframe, i.e., the $2^{nd}$ subframe boundary as shown in FIG. 7.

As described in the first embodiment, in case of normal CP and no PDCCH region in the unlicensed band, a normal PDSCH consists of 14 OFDM symbols. Therefore, the first part (shortened PDSCH part) of the first PDSCH in the second embodiment which starts from the first available OFDM symbol to the ending boundary of the current subframe can have 14 to 1 OFDM symbols. The first part is same as the first PDSCH in the first embodiment. The second part (normal PDSCH part) of the first PDSCH is a normal PDSCH sending in the next subframe to the current subframe. In the second embodiment, the first part of the first PDSCH is scheduled together with the second part as one extended PDSCH by one DCI in for example the subframe sending the second part to one (group of) UE.

The bits of the extended PDSCH could be:

1. Separately encoded transport blocks, i.e. bits in the first part and bits in the second PDSCH are encoded separately. For the first part as a shortened PDSCH, the same PDSCH mapping, RS mapping, and TBS determination from shifted DwPTS as used in the first embodiment can also be used for minimal specification impact.

2. Jointly encoded transport block, i.e. bits in the first part and bits in the second part are encoded and mapped jointly as one extended PDSCH. In this case, it is possible to reuse the RS mapping defined in 3GPP 36.211 and define new TBS determination, e.g., $N_{PRB}=\max\{\lfloor N'_{PRB} \times \beta \rfloor, 1\}$, where $N_{PRB}$ is the column indicator of TBS table in 3GPP 36.213, $N'_{PRB}$ is the total number of allocated PRBs, and $\beta$ is a coefficient derived from the number of data REs in a target PDSCH (for example, $\beta$ can be derived through dividing the number of data REs in the target PDSCH by the average number of data RES in the existing PDSCHs; in addition, different $\beta$ can be used for different PDSCH lengths, or a common $\beta$ can be used for multiple PDSCH lengths for example by averaging individual $\beta$).

3. TTI bundling, i.e. bits in the first part and bits in second part are same/different RVs (Redundant Version) of same encoded bits of a transport block, while the first part can be a truncated one based on used OFDM symbols. In this case, it is possible to reuse the RS mapping defined in 3GPP 36.211 and TBS defined in 3GPP 36.213.

In the second embodiment, in order to indicate the time period of the first PDSCH of the burst in the unlicensed carrier, a DCI would be sent at PDCCH/EPDCCH of the licensed band. The DCI can be sent after or before the unlicensed channel is occupied by the eNB. For example, the DCI can be sent in the subframe transmitting the first part or the second part of the first PDSCH. In the example of FIG. 7, the DCI is sent in the subframe transmitting the second part. The DCI for the first PDSCH contains at least a length indicator to indicate the length of the first PDSCH, and can optionally contain an ending indicator to indicate the ending time of the first PDSCH. In the second embodiment, since the subframe sending DCI can be fixed or configured to be either the subframe transmitting the first part of the first PDSCH or the subframe transmitting the second part, the UE can know the ending of the first PDSCH, and therefore, the ending indicator can be omitted. For the length indicator for indicating the length of first PDSCH for example in terms of OFDM symbol, for example, 4 bits can be used to indicate the PDSCH length from 15 to 28 OFDM symbols. Alternatively, a reduced number of bits can also be used in connection with a reduced set of possible starting positions in order to reduce signaling overhead as well as increase the robustness of the DCI due to the reduced coding rate. For example, a 2-bit indicator can be used for length of 15/20/23/26 OFDM symbols, or a 1-bit indicator can be used for length of 15/20 OFDM symbols.

The above method can also be applied to OFDM symbols with extended CP. According to the embodiment, buffering PDSCH with different lengths in eNB may be needed due to unpredictable time for successful CCA, and the UE may need to buffer one previous subframe for first PDSCH.

Third Embodiment

In the third embodiment, the eNB transmits the first PDSCH of the burst starting with the first available OFDM symbol after the second carrier is occupied by the eNB and ending either with the ending boundary of the subframe in which the first PDSCH starts or with the ending boundary of the next subframe to the subframe in which the first PDSCH starts. Here, both the PDSCH scheduling mechanisms in the first embodiment and the second embodiment can be adopted by the eNB using one DCI format, and which one will be adopted would depend on scheduling strategy at eNB, in other words, whether the shortened PDSCH as in the first embodiment or the extended PDSCH as in the second embodiment will be scheduled would depend on scheduling strategy at eNB, and one DCI format is used for the two cases. It is noted that the DCI format in the third embodiment can also be used for a normal PDSCH. In the third embodiment, PDSCH mapping, RS mapping, TBS determination, and encoding can use the same methods as in the first embodiment and the second embodiment respectively.

The scheduling strategy at eNB can consider one or more of following features:

1. UE capability:
   If UE doesn't support extended PDSCH, no extended PDSCH will be scheduled for this UE.
   If UE doesn't support shortened PDSCH, no shortened PDSCH will be scheduled for this UE.
   If UE only supports normal PDSCH, no shortened/extended PDSCH will be scheduled for this UE, i.e. the UE will be scheduled only in the middle of a burst.
2. Unlicensed channel condition:
   If a shortened PDSCH would include too small a number of OFDM symbols or no RS, extended PDSCH would be scheduled preferably.
3. Licensed control overhead:
   If load in PDCCH/EPDCCH of licensed band is high, extended PDSCH requiring less scheduling overhead would be preferred.
4. eNB's certain preference
   E.g., predefined preference at eNB.

Figure 8:
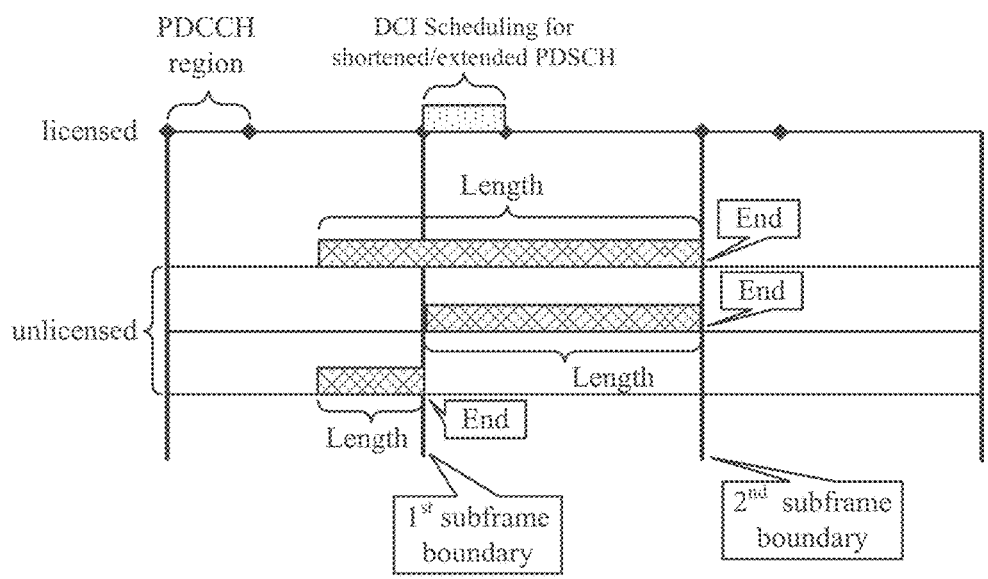
FIG. 8 schematically illustrates an exemplary time sequence diagram for the licensed carrier and the unlicensed carrier according to a third embodiment of the present disclosure.

In order to indicate the time period of the first PDSCH of the burst in the unlicensed carrier, a DCI would be sent at PDCCH/EPDCCH of the licensed band. The DCI can be sent after or before the unlicensed channel is occupied by the eNB. For example, FIG. 8 schematically illustrates an exemplary time sequence diagram for the licensed carrier and the unlicensed carrier according to the third embodiment of the present disclosure. As shown in FIG. 8, three possible first PDSCHs in the unlicensed band are illustrated, the upper one is an extended PDSCH as described in the second embodiment, the middle one is a normal PDSCH as a special case described in the first embodiment, and the bottom one is a shortened PDSCH as described in the first embodiment. In order to uniformly indicate the time period of the three PDSCH in one DCI format, the DCI for the first PDSCH can be transmitted in the subframe transmitting the second part of the extended PDSCH or the subframe transmitting the normal PDSCH or the next subframe to the subframe transmitting the shortened PDSCH, as shown in FIG. 8. The DCI can contain an ending indicator (i.e., ending subframe boundary field) to indicate whether the ending time of the first PDSCH is the starting boundary or the ending boundary of the subframe transmitting the DCI and a length indicator to indicate the length of the first PDSCH.

Specially, for the ending subframe boundary field in DCI, one bit can be used to indicate the ending time (e.g., the ending subframe boundary) for example with respect to the subframe for sending the DCI in (E)PDCCH. For example, "0" indicates that the PDSCH ends at the starting boundary ($1^{st}$ subframe boundary in FIG. 8) of the subframe sending the DCI, and "1" indicates that the PDSCH ends at the ending boundary ($2^{nd}$ subframe boundary in FIG. 8) of the subframe sending the DCI.

For the length indicator for indicating the length of first PDSCH for example in terms of OFDM symbol, for example, 5 bits can be used to indicate the PDSCH length from 1 to 28 OFDM symbols. Alternatively, a reduced number of bits can be used in connection with a reduced set of possible starting positions in order to reduce signaling overhead as well as increase the robustness of the DCI due to the reduced coding rate. For example, in the case that the DCI is transmitted in the subframe as shown in FIG. 8, if the PDSCH ends at the starting boundary ($1^{st}$ subframe boundary in FIG. 8) of the subframe sending the DCI, the length of the PDSCH can be only 1-13 symbols (shortened PDSCH), and if the PDSCH ends at the ending boundary ($2^{nd}$ subframe boundary in FIG. 8) of the subframe sending the DCI, the length of the PDSCH can be only 14-28 symbols (normal PDSCH or extended PDSCH). In this case, a 4-bit indicator can be used to indicate length of 1 to 13 OFDM symbols or length of 14 to 28 OFDM symbols, and the time period can be determined by the length indicator in connection with the ending indicator.

The above method can also be applied to OFDM symbols with extended CP. According to the embodiment, buffering PDSCH with different lengths in eNB may be needed due to unpredictable time for successful CCA, and the UE may need to buffer one previous subframe for first PDSCH.

Fourth Embodiment

Due to regulation restriction on maximum burst length (e.g., maximum burst length <4 ms in Japan) and/or the flexible burst starting time, it would lead to flexible burst ending time in order to utilize the maximum burst length allowed by regional regulation. When the last PDSCH of the burst would end at the middle of a subframe, shortened PDSCH in DwPTS could be directly used for flexible ending time in granularity of OFDM symbol. Alternatively, the shortened PDSCH and the previous one normal PDSCH can be scheduled together as an extended PDSCH by one DCI to one (group of) UE. The extended PDSCH or the shortened PDSCH is referred to as the flexible last PDSCH of the burst.

The bits of the extended PDSCH could be:

1. Separately encoded transport blocks, i.e. bits in the shortened PDSCH part of the last subframe and bits in the normal PDSCH part of the $2^{nd}$ last subframe are encoded separately. For the shortened PDSCH part, the same PDSCH mapping, RS mapping, and TBS determination from shifted DwPTS without shifting as used in the first embodiment can be used for minimal specification impact.

2. Jointly encoded transport block, i.e. bits in the shortened PDSCH part of the last subframe and bits in the normal PDSCH part of the $2^{nd}$ last subframe are encoded and mapped as one extended PDSCH. In this case, it is possible to reuse the RS mapping defined in 3GPP 36.211 and define new TBS determination, e.g., $N_{PRB}=\max\{\lfloor N'_{PRB} \times \beta \rfloor, 1\}$, where $N_{PRB}$ is the column indicator of TBS table in 3GPP 36.213, $N'_{PRB}$ is the total number of allocated PRBs, $\beta$ is a coefficient derived from the number of data REs in a target PDSCH (for example, $\beta$ can be derived through dividing the number of data REs in the target PDSCH by the average number of data RES in the existing PDSCHs; in addition, different $\beta$ can be used for different PDSCH lengths, or a common $\beta$ can be used for multiple PDSCH lengths for example by averaging individual $\beta$).

3. TTI bundling, i.e. bits in the shortened PDSCH part of the last subframe and bits in the normal PDSCH part of the $2^{nd}$ last subframe are same/different RVs (redundant version) of same encoded bits of a transport block, while the shortened PDSCH part is a truncated one based on used OFDM symbols. In this case, it is possible to reuse the RS mapping defined in 3GPP 36.211 and TBS defined in 3GPP 36.213.

Figure 9:
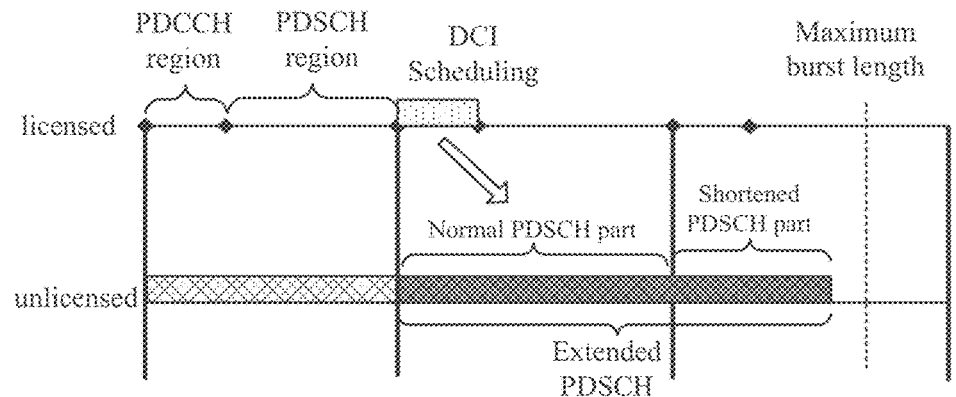
FIG. 9 schematically illustrates an exemplary time sequence diagram for the licensed carrier and the unlicensed carrier according to a fourth embodiment of the present disclosure.

FIG. 9 schematically illustrates an exemplary time sequence diagram for the licensed carrier and the unlicensed carrier according to the fourth embodiment of the present disclosure. As shown in FIG. 9, in the unlicensed band, the last PDSCH of the burst is an extended PDSCH which includes a normal PDSCH part and a shorten PDSCH part. In order to indicate the time period of the last PDSCH of the burst in the unlicensed carrier, a DCI would be sent at PDCCH/EPDCCH of the licensed band. The DCI for the flexible last PDSCH of the burst (the last PDSCH of the burst as the flexible PDSCH) contains a length indicator to indicate the length of the last PDSCH, wherein the length starts from for example the starting boundary of the subframe transmitting the DCI. The DCI can optionally contain a starting indicator to indicate the starting time of the last PDSCH. However, since the starting boundary of the last PDSCH can be fixed to the starting boundary of the subframe sending the DCI as shown in FIG. 9, the UE can know the starting of the last PDSCH, and therefore the starting indicator can be omitted. For the length indicator for indicating the length of first PDSCH for example in terms of OFDM symbol, for example, 4 bits can be used to indicate the PDSCH length from 15 to 28 OFDM symbols. Alternatively, a reduced number of bits (e.g., a 2-bit indicator for length of 15/20/23/28 OFDM symbols, or a 1-bit indicator for length of 15/20 OFDM symbols) can be used in connection with a reduced set of possible starting positions in order to reduce signaling overhead as well as increase the robustness of the DCI due to the reduced coding rate.

The above method can also be applied to OFDM symbols with extended CP. In addition, if the last PDSCH of burst does not adopt the extended PDSCH but directly uses a shortened PDSCH, a similar DCI can be used to indicate the time period of the last shortened PDSCH, the only difference is that the length indicator for the shortened PDSCH indicates a length from 1-13 symbols in case of normal CP. In addition, the DCI for the shortened DCI can also be used for a normal PDSCH by indicating the length of 14 in case of normal CP.

Fifth Embodiment

In the fifth embodiment, the selection between shortened and extended PDSCHs for the last PDSCH of the burst can depend on scheduling strategy at eNB. And the same DCI format can be used for the shortened and extended PDSCHs and optionally the normal PDSCH.

The scheduling strategy at eNB would consider one or more of following features:

1. UE capability:
   If UE doesn't support extended PDSCH, no extended PDSCH will be scheduled for this UE.
   If UE doesn't support shortened PDSCH, no shortened PDSCH will be scheduled for this UE.
   If UE only supports normal PDSCH, no shortened/extended PDSCH will be scheduled for this UE, i.e. the UE will be scheduled only in the middle of a burst.

2. Unlicensed channel condition:
   If a shortened PDSCH would include too small a number of OFDM symbols or no RS, extended PDSCH would be scheduled preferably.
3. Licensed control overhead:
   If load in PDCCH/EPDCCH of licensed band is high, extended PDSCH requiring less scheduling overhead would be preferred.
4. eNB's certain preference
   E.g., predefined preference at eNB.

Figure 10:
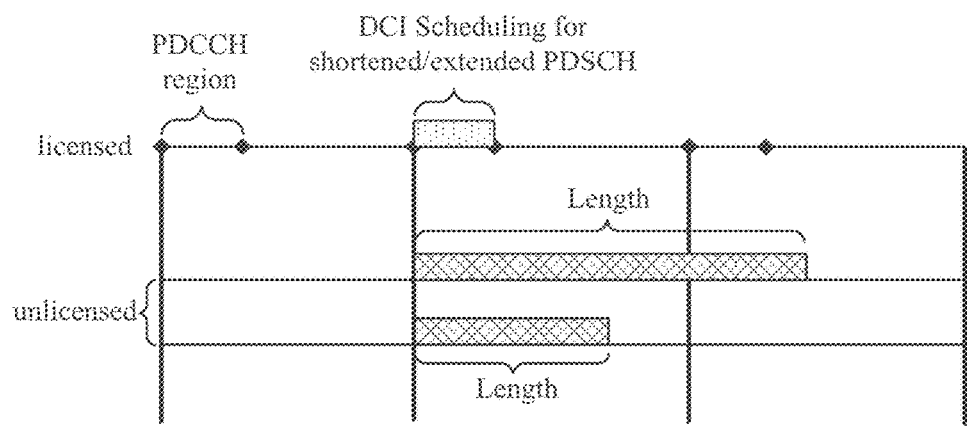
FIG. 10 schematically illustrates an exemplary time sequence diagram for the licensed carrier and the unlicensed carrier according to a fifth embodiment of the present disclosure.

In order to indicate the time period of the last PDSCH of the burst in the unlicensed carrier, a DCI would be sent at PDCCH/EPDCCH of the licensed band. For example, FIG. 10 schematically illustrates an exemplary time sequence diagram for the licensed carrier and the unlicensed carrier according to the fifth embodiment of the present disclosure. As shown in FIG. 10, two possible flexible last PDSCHs in the unlicensed band are illustrated, the upper one is an extended subframe and the bottom one is a shortened subframe. In order to uniformly indicate the time period of the two types of PDSCHs in one DCI format, the DCI for the last PDSCH can be transmitted in the subframe starting to transmit the last PDSCH as shown in FIG. 10. The DCI contains at least a length indicator to indicate the length of the last PDSCH, and can optionally contain a starting indicator to indicate the starting time of the last PDSCH. In the fifth embodiment, since the starting boundary of the last PDSCH can be fixed to the starting boundary of the subframe sending the DCI as shown in FIG. 10, the UE can know the starting of the last PDSCH, and therefore, the starting indicator can be omitted. For the length indicator for indicating the length of first PDSCH for example in terms of OFDM symbol, for example, 5 bits can be used to indicate the PDSCH length from 1 to 28 OFDM symbols. Alternatively, a reduced number of bits (e.g., a 2-bit indicator for length of 9/11/14/(14+6) OFDM symbols) can be used in connection with a reduced set of possible starting positions in order to reduce signaling overhead as well as increase the robustness of the DCI due to the reduced coding rate.

It is noted that the above method can also be applied to OFDM symbols with extended CP.

Sixth Embodiment

Based on the third embodiment, whether the shortened PDSCH or the extended PDSCH will be scheduled for the first PDSCH in the burst would be selected depending on scheduling strategy at eNB, and one DCI format can be used to indicate both the types of PDSCHs. In the fifth embodiment, the selection between shortened and extended PDSCHs for the last PDSCH of the burst can also depend on scheduling strategy at eNB, and both the types of PDSCHs can also be indicated by one DCI format. In the sixth embodiment, one DCI format can be used to indicate both the first and the last PDSCH for both the shortened PDSCH and the extended PDSCH. Here, there could be the following cases: 1) shortened PDSCH in the beginning of the burst and shortened PDSCH in the last of the burst, 2) shortened PDSCH in the beginning of the burst and extended PDSCH in the last of the burst, 3) extended PDSCH in the beginning of the burst and shortened PDSCH in the last of the burst, and 4) extended PDSCH in the beginning of the burst and extended PDSCH in the last of the burst. It is noted that, as a special case, the first and the last PDSCH can also be a normal PDSCH, and it can also be optionally indicated by the DCI defined in the sixth embodiment. Whether the eNB uses a normal DCI or the DCI defined in the present disclosure for the normal PDSCH can be specified or configured.

Figure 11:
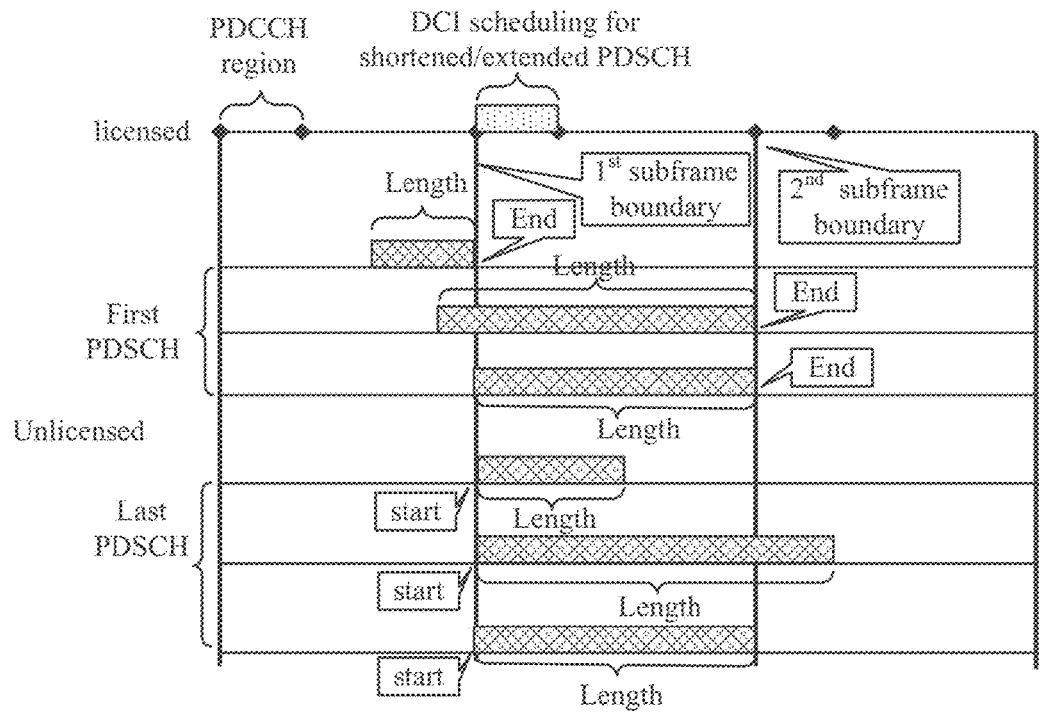
FIG. 11 schematically illustrates an exemplary time sequence diagram for the licensed carrier and the unlicensed carrier according to a sixth embodiment of the present disclosure.

FIG. 11 schematically illustrates an exemplary time sequence diagram for the licensed carrier and the unlicensed carrier according to the sixth embodiment of the present disclosure. As shown in FIG. 11, three possible first PDSCHs and three possible last PDSCHs in the unlicensed band are illustrated, the first-row PDSCH is a shortened PDSCH as the first PDSCH, the second-row PDSCH is an extended PDSCH as the first PDSCH, the third-row PDSCH is a normal PDSCH as the first PDSCH, the fourth-row PDSCH is a shortened PDSCH as the last PDSCH, the fifth-row PDSCH is an extended PDSCH as the last PDSCH, and the sixth-row PDSCH is a normal PDSCH as the last PDSCH. The DCI for respectively scheduling these PDSCHs can be transmitted in the subframe transmitting the second part of the extended PDSCH or the subframe transmitting the normal PDSCH or the next subframe to the subframe transmitting the shortened PDSCH if the PDSCH is the first PDSCH and in the subframe starting to transmit the PDSCH if the PDSCH is the last PDSCH.

In order to uniformly indicate the time period of all these types of PDSCHs in one DCI format, the DCI can contain a length indicator to indicate the length of the PDSCH and a starting-ending indicator to indicate the ending time of the PDSCH is the starting boundary of the subframe transmitting the DCI, or the ending time of the PDSCH is the ending boundary of the subframe transmitting the DCI, or the starting time of the PDSCH is the starting boundary of the subframe transmitting the DCI. In addition, the starting-ending indicator can also imply whether the PDSCH is the first PDSCH or the last PDSCH since the DCI for the first PDSCH indicates the ending time and the DCI for the last PDSCH indicates the starting time.

Specifically, for the starting-ending indicator, for example, 2 bits can be used to indicate the starting or ending subframe boundary for example with respect to the subframe of sending the DCI (PDCCH/EPDCCH). For example, "00" can be used to indicate the PDSCH ends at the starting boundary of the subframe sending the DCI ($1^{st}$ subframe boundary in FIG. 11), "01" can be used to indicate the PDSCH ends at the ending subframe boundary of the subframe sending the DCI ($2^{nd}$ subframe boundary in FIGS. 11), and "10" can be used to indicate the PDSCH starts at the starting boundary of the subframe sending the DCI ($1^{st}$ subframe boundary in FIG. 11).

For the length indicator for indicating the length of the PDSCH for example in terms of OFDM symbol, for example, 5 bits can be used to indicate the PDSCH length from 1 to 28 OFDM symbols. Alternatively, a reduced number of bits (e.g., a 3-bit indicator for length of 6/9/10/11/12/14/(14+3)/(14+6) OFDM symbols) can be used in connection with a reduced set of possible starting positions in order to reduce signaling overhead as well as increase the robustness of the DCI due to the reduced coding rate.

It is noted that the above method can also be applied to OFDM symbols with extended CP.

Seventh Embodiment

In the seventh embodiment, the eNB can transmit the first PDSCH of the burst starting with the first available OFDM symbol after the second carrier is occupied by the eNB with a fixed length, in particular with a length of a normal PDSCH. In other words, in the seventh embodiment, the first PDSCH of the burst is a normal length PDSCH with a shifted starting symbol. After successful CCA in the unlicensed band, the eNB sends data in PDSCH which starts with the first OFDM symbol available for data transmission (in case of reservation signal such as preamble, RTS/CTS or PSS/SSS is sent after CCA ending) and ends with the OFDM symbol based on a fixed number of OFDM symbols. In case of normal CP and no PDCCH region in the unlicensed band, a normal PDSCH consists of 14 OFDM symbols. The starting symbol of the first PDSCH is from the $1^{st}$ to $14^{th}$ depending on CCA ending time, while the ending time of PDSCH is from $14^{th}$ to $1^{st}$ if the length of the PDSCH keeps 14 OFDM symbols. In the seventh embodiment, the first PDSCH of the burst starts and ends at a flexible time in terms of OFDM symbol boundary based on CCA ending.

Figure 12:
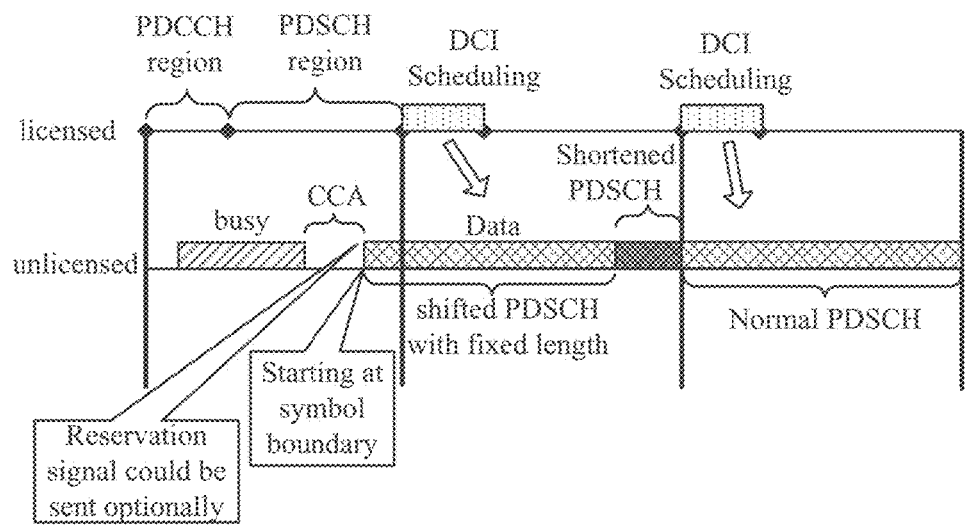
FIG. 12 schematically illustrates an exemplary time sequence diagram for the licensed carrier and the unlicensed carrier according to a seventh embodiment of the present disclosure.
Figure 13:
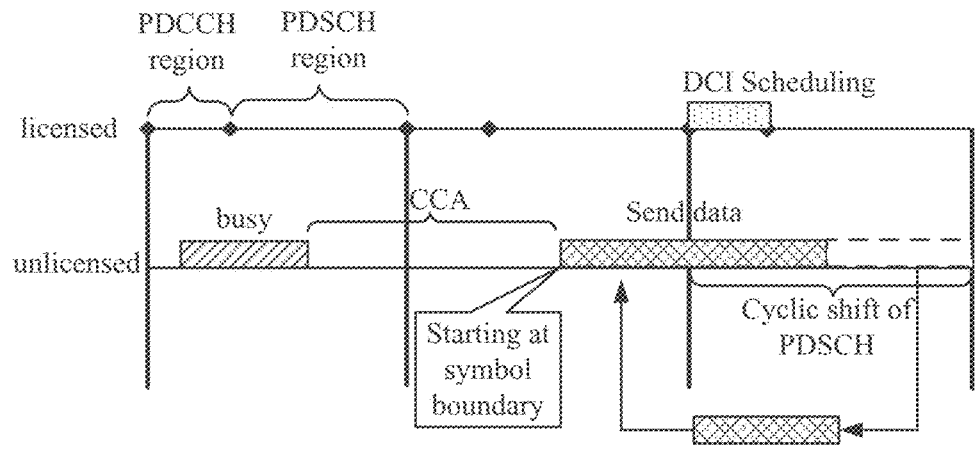
FIG. 13 schematically illustrates an exemplary time sequence diagram for explaining the cyclic shift of the PDSCH according to the seventh embodiment of the present disclosure.

FIG. 12 schematically illustrates an exemplary time sequence diagram for the licensed carrier and the unlicensed carrier according to the seventh embodiment of the present disclosure. As shown in FIG. 12, the eNB transmits the first PDSCH of the burst starting with the first available OFDM symbol after the second carrier is occupied by the eNB and the first PDSCH has a fixed length of one normal PDSCH. The normal length PDSCH with a shifted starting symbol (which can also be referred to as a flexible PDSCH) can reuse the structure of current normal PDSCH by for example entire shift or cyclic shift. The entire shift means that a normal PDSCH is entirely shifted to the flexible PDSCH such that the starting part of the normal PDSCH is shifted to the starting part of the flexible PDSCH and the ending part of the normal PDSCH is shifted to the ending part of the flexible PDSCH. The cyclic shift means that the front part of the flexible PDSCH comes from the rear part of a normal PDSCH and the rear part of the flexible PDSCH comes from the front part of the normal PDSCH, as shown in FIG. 13 which schematically illustrates an exemplary time sequence diagram for explaining the cyclic shift of the PDSCH according to the seventh embodiment of the present disclosure.

In order to indicate the time period of the flexible first PDSCH of the burst in the unlicensed carrier, a DCI would be sent at PDCCH/EPDCCH of the licensed band. The DCI can be sent after or before the unlicensed channel is occupied by the eNB. For example, the DCI can be sent in the next subframe to the subframe starting transmission of the first PDSCH. In the example of FIG. 12, the DCI is sent in the subframe transmitting the second part. The DCI for the first PDSCH contains an offset length indicator to indicate the offset length of the starting time of the first PDSCH with respect to a reference boundary and a reference boundary indicator to indicate whether the reference boundary is the starting time or the ending time of the subframe transmitting the DCI.

Specifically, for the reference boundary indicator, for example, one bit can be used to indicate a reference boundary for example with respect to the subframe sending the DCI (in PDCCH/EPDCCH). For example, "0" can be used to indicate the reference boundary is the starting boundary ($1^{st}$ subframe boundary in FIG. 12) of the subframe sending the DCI, while "1" can be used to indicate the reference boundary is the ending boundary ($2^{nd}$ subframe boundary in FIG. 12) of the subframe sending the DCI.

For the offset length indicator, for example, 4 bits can be used to indicate the PDSCH offset by 0 to 13 OFDM symbols before the reference boundary ("0" means no offset and the first PDSCH is a normal PDSCH). A reduced number of bits (e.g., 2-bit indicator for length of 0/6/9/12 OFDM symbols) can be used in connection with a reduced set of possible starting positions in order to reduce signaling overhead as well as increase the robustness of the DCI due to the reduced coding rate.

Refer back to FIG. 12, for the second PDSCH of the burst, a shortened PDSCH can be adopted to align with the subsequent subframe boundary. The shortened second PDSCH can be scheduled together or independently with the first PDSCH or the third PDSCH. If the shortened PDSCH is scheduled independently, the method of PDSCH&RS mapping and TBS determination in the first embodiment can be used. If the shortened PDSCH is scheduled together with the first PDSCH or the third PDSCH as one extended PDSCH, the method of PDSCH&RS mapping and TBS determination in the second embodiment can be used. It is noted that the second PDSCH and possibly subsequent PDSCHs of the bust may also adopt a shifted PDSCH with a fixed length. In this case, the scheduling method of the second PDSCH is the same as the shifted first PDSCH with the fixed length.

Figure 14:
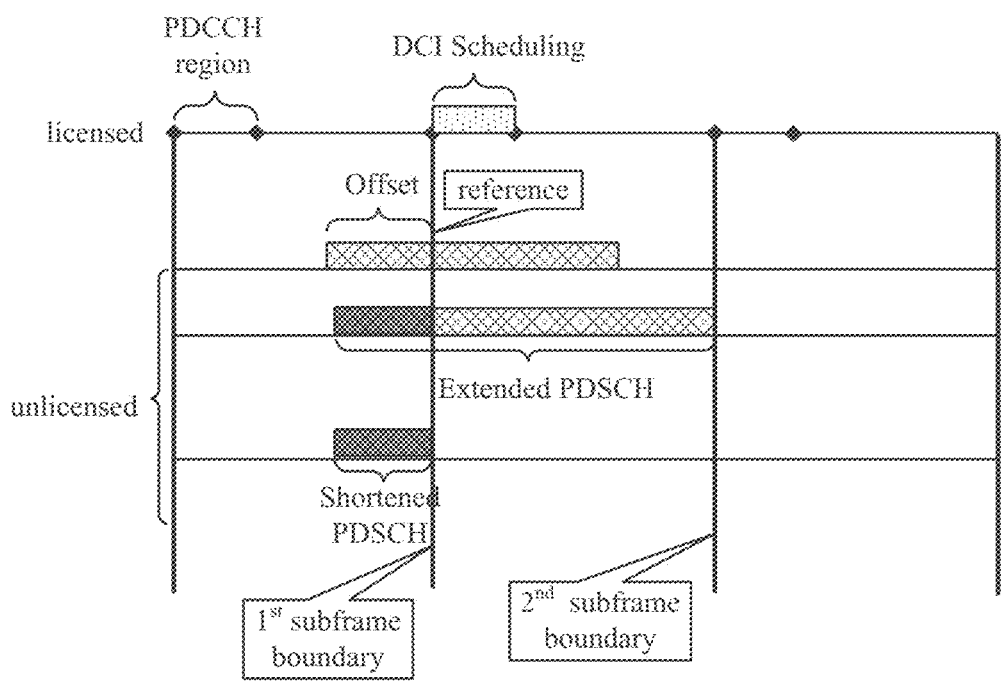
FIG. 14 schematically illustrates an exemplary time sequence diagram for the licensed carrier and the unlicensed carrier according to another example of the seventh embodiment of the present disclosure.

In addition, as another example of the seventh embodiment, the first PDSCH is not necessarily a PDSCH with a fixed length, but can also be a PDSCH ending with the ending boundary of the subframe starting the first PDSCH (e.g., a shortened PDSCH) or a PDSCH end indicator to indicate the first PDSCH has a fixed length, or a PDSCH ending with the ending boundary of the next subframe to the subframe starting the first PDSCH (an extended PDSCH). FIG. 14 schematically illustrates an exemplary time sequence diagram for the licensed carrier and the unlicensed carrier according to this example of the seventh embodiment of the present disclosure. In FIG. 14, three possible first PDSCHs in the unlicensed band are illustrated. The upper PDSCH is a PDSCH with a fixed length of one normal PDSCH, the middle PDSCH is an extended PDSCH, and the bottom PDSCH is a shortened PDSCH. In order to uniformly indicate the time period of these first PDSCH, the DCI contains a PDSCH end indicator in addition to the above offset length indicator and reference boundary indicator. The PDSCH end indicator indicates the first PDSCH has a fixed length, the first PDSCH is a shortened PDSCH, or the first PDSCH is an extended PDSCH. For example, a 2-bit indicator can be used to make such indication, e.g., "00" for the PDSCH with a fixed length, "01" for the shortened PDSCH, "10" for the extended PDSCH. When the first PDSCH is a shortened PDSCH, the offset length indicator indicates the length of the shortened PDSCH and the reference boundary indicator indicates the ending time of the shortened PDSCH. When the first PDSCH is an extended PDSCH, the offset length indicator indicates the length of the extended PDSCH minus one normal PDSCH length and the reference boundary indicator indicates the ending time of the first part (the shortened PDSCH part) of the extended PDSCH. It is noted that the DCI defined for this example can also be used for a normal PDSCH for example by setting the offset length to 0 for the PDSCH with a fixed length of one normal PDSCH length.

Similarly, the above method can also be applied to OFDM symbols with extended CP.

The present disclosure can be realized by software, hardware, or software in cooperation with hardware. Each functional block used in the description of each embodiment described above can be realized by an LSI as an integrated circuit. They may be individually formed as chips, or one chip may be formed so as to include a part or all of the functional blocks. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, an FPGA (Field Programmable Gate Array) that can be programmed after the manufacture of the LSI or a reconfigurable processor in which the connections and the settings of circuit cells disposed inside the LSI can be reconfigured may be used. Further, the calculation of each functional block can be performed by using a calculating device, for example, including a DSP or a CPU, and the processing step of each function may be recorded on a recording medium as a program for execution. Furthermore, when a technology for implementing an integrated circuit that substitutes the LSI appears in accordance with the advancement of the semiconductor technology or other derivative technologies, it is apparent that the functional block may be integrated by using such technologies.

It is noted that the present disclosure intends to be variously changed or modified by those skilled in the art based on the description presented in the specification and known technologies without departing from the content and the scope of the present disclosure, and such changes and applications fall within the scope that claimed to be protected. Furthermore, in a range not departing from the content of the disclosure, the constituent elements of the above-described embodiments may be arbitrarily combined.

What is claimed is:

1. A communication apparatus comprising:
   a receiver, which, in operation, receives low overhead scheduling information that indicates occupied Orthogonal Frequency Division Multiplexin (OFDM) symbols within a last one or two consecutive subframes for transmission of downlink data and, in operation, receives the downlink data that is mapped to the occupied OFDM symbols in the last one or two consecutive subframes, wherein a number of the occupied OFDM symbols in the last one or two consecutive subframes is one selected from a subset of numbers which is smaller than a set of all possible numbers of symbols that could occupy the last one or two consecutive subframes; and
   control circuitry, which, in operation, identifies the occupied OFDM symbols within the last one or two consecutive subframes according to the received scheduling information, wherein an ending position of the occupied OFDM symbols is located at a variable position that is different from subframe boundaries.

2. The communication apparatus according to claim 1, wherein the ending position of the occupied OFDM symbols is shifted from the subframe boundaries in units of OFDM symbols.

3. The communication apparatus according to claim 1, wherein the subset of numbers, from which the number of the occupied OFDM symbols in the last one or two consecutive subframes is selected, includes 6, 9, 10, 11, 12 and 14.

4. The communication apparatus according to claim 1, wherein the receiver receives the scheduling information on a first subframe and the control circuitry identifies the occupied OFDM symbols at least in a second subframe located next to the first subframe according to the received scheduling information.

5. The communication apparatus according to claim 1, wherein the scheduling information is mapped in a four-bit field of a Downlink Control Information (DCI) format and a value of the four-bit field indicates a number of the occupied OFDM symbols in the last one or two consecutive subframes.

6. The communication apparatus according to claim 1, wherein the ending position of the occupied OFDM symbols is aligned with an ending position of a Downlink Pilot Time Slot (DwPTS) within one of the last one or two consecutive subframes.

7. The communication apparatus according to claim 6, wherein a starting position of occupied OFDM symbols within a first subframe for transmission of the downlink data is located at a variable position that is different from the subframe boundaries.

8. A communication method comprising:
   receiving low overhead scheduling information that indicates occupied Orthogonal Frequency Division Multiplexin (OFDM) symbols within a last one or two consecutive subframes for transmission of downlink data, wherein a number of the occupied OFDM symbols in the last one or two consecutive subframes is one selected from a subset of number which is smaller than a set of all possible numbers of symbols that could occupy the last one or two consecutive subframes;
   identifying the occupied OFDM symbols within the last one or two consecutive subframes according to the received scheduling information, wherein an ending position of the occupied OFDM symbols is located at a variable position that is different from subframe boundaries; and
   receiving the downlink data that is mapped to the occupied OFDM symbols.

9. The communication method according to claim 8, wherein the ending position of the occupied OFDM symbols is shifted from the subframe boundaries in units of OFDM symbols.

10. The communication method according to claim 8, wherein the subset of numbers, from which the number of the occupied OFDM symbols in the last one or two consecutive subframes is selected, includes 6, 9, 10, 11, 12 and 14.

11. The communication method according to claim 8, wherein the scheduling information is received on a first subframe and the identifying includes identifying the occupied OFDM symbols at least in a second subframe located next to the first subframe according to the received scheduling information.

12. The communication method according to claim 8, wherein the scheduling information is mapped in a four-bit field of a Downlink Control Information (DCI) format and a value of the four-bit field indicates a number of the occupied OFDM symbols in the last one or two consecutive subframes.

13. The communication method according to claim 8, wherein the ending position of the occupied OFDM symbols is aligned with an ending position of a Downlink Pilot Time Slot (DwPTS) within one of the last one or two consecutive subframes.

14. The communication method according to claim 13, wherein a starting position of occupied OFDM symbols within a first subframe for transmission of the downlink data is located at a variable position that is different from the subframe boundaries.

15. An integrated circuit comprising:
   at least one input; and
   control circuitry coupled to the at least one input, which, in operation, controls:
   receiving, via the at least one input, low overhead scheduling information that indicates occupied Orthogonal Frequency Division Multiplexing (OFDM) symbols within a last one or two consecutive subframes for transmission of downlink data, wherein a number of the occupied OFDM symbols in the last one or two consecutive subframes is one selected from a subset of numbers which is smaller than a set of all possible numbers of symbols that could occupy the last one or two consecutive subframes;

identifying the occupied OFDM symbols within the last one or two consecutive subframes according to the received scheduling information, wherein an ending position of the occupied OFDM symbols is located at a variable position that is different from subframe boundaries; and receiving, via the at least one input, the downlink data that is mapped to the occupied OFDM symbols.

16. The integrated circuit according to claim 15, wherein the subset of numbers, from which the number of the occupied OFDM symbols in the last one or two consecutive subframes is selected, includes 6, 9, 10, 11, 12 and 14.

\* \* \* \* \*